(12) United States Patent
Le Loarer

(10) Patent No.: US 11,890,779 B2
(45) Date of Patent: Feb. 6, 2024

(54) MANUFACTURING PROCESS FOR A WATCH COMPONENT MADE OF A COMPOSITE MATERIAL

(71) Applicant: Manufacture d'Horlogerie Audemars Piguet SA, Le Brassus (CH)

(72) Inventor: Thibaut Le Loarer, Chavannaz (FR)

(73) Assignee: Manufacture D'Horlogerie Audemars Piguet SA, Le Brassus (CH)

( * ) Notice: Subject to any disclaimer, the term of this patent is extended or adjusted under 35 U.S.C. 154(b) by 75 days.

(21) Appl. No.: 17/711,653

(22) Filed: Apr. 1, 2022

(65) Prior Publication Data
US 2022/0332009 A1    Oct. 20, 2022

(30) Foreign Application Priority Data

Apr. 19, 2021 (CH) .................................. 00410/21

(51) Int. Cl.
| | | |
|---|---|---|
| B28B 11/24 | (2006.01) | |
| B28B 1/52 | (2006.01) | |
| B28B 3/02 | (2006.01) | |
| G04B 15/14 | (2006.01) | |
| G04B 37/22 | (2006.01) | |

(52) U.S. Cl.
CPC ............. *B28B 1/522* (2013.01); *B28B 3/025* (2013.01); *B28B 11/24* (2013.01); *G04B 15/14* (2013.01); *G04B 37/225* (2013.01)

(58) Field of Classification Search
None
See application file for complete search history.

(56) References Cited

U.S. PATENT DOCUMENTS

| | | | |
|---|---|---|---|
| 8,906,498 B1 | 12/2014 | Biberger | |
| 2004/0231159 A1* | 11/2004 | Shibuya | C23C 14/165 29/896.412 |
| 2012/0308837 A1* | 12/2012 | Schlechtriemen | C04B 35/119 428/446 |
| 2018/0305266 A1* | 10/2018 | Gibson | B33Y 40/20 |
| 2019/0256427 A1* | 8/2019 | Shim | B32B 18/00 |
| 2020/0061954 A1* | 2/2020 | Francois | B32B 15/20 |
| 2022/0411337 A1* | 12/2022 | Birol | C04B 35/571 |

FOREIGN PATENT DOCUMENTS

| | | | | |
|---|---|---|---|---|
| CN | 109278382 A | * | 10/2010 | ............. B32B 18/00 |
| CN | 108299000 A | | 7/2018 | |

OTHER PUBLICATIONS

Jia CN109278382A 2010 English Translation (Year: 2010).*
Gui Kaixuan CN108299000 2018 English Translation (Year: 2018).*

* cited by examiner

*Primary Examiner* — Jacob T Minskey
*Assistant Examiner* — Adrien J Bernard
(74) *Attorney, Agent, or Firm* — Blank Rome LLP

(57) ABSTRACT

The present invention relates to a manufacturing process for a watch component (50) in composite material with a ceramic matrix comprising the following steps: depositing in a mould a succession of layers (10, 20, 30, 40) each comprising a ceramic powder (12), at least one layer (10; 10, 30; 10, 20, 30, 40) further including fibres (14) mixed with the ceramic powder (12), the fibres (14) being arranged randomly; performing a FAST/SPS sintering operation; demoulding the sintered watch component comprising the succession of layers (10, 20, 30, 40), and optionally machining the sintered component to the final dimensions of the watch component (50). The fibres (14) are visible on the surface of the watch component (50).

14 Claims, 2 Drawing Sheets

MANUFACTURING PROCESS FOR A WATCH COMPONENT MADE OF A COMPOSITE MATERIAL

RELATED APPLICATION

The present application claims priority to Swiss Patent Application No. 00410/21, filed Apr. 19, 2021. The contents of this application is incorporated hereby in its entirety.

FIELD OF THE INVENTION

The present invention relates to a manufacturing process for a watch component in composite material with a ceramic matrix. The invention also relates to a method of authenticating or identifying a timepiece.

STATE OF THE ART

Conventional composite materials, which have a polymer matrix and fibres, have good mechanical strength but low hardness and thus moderate resistance to abrasion and scratches. Forged composites, for their part, present an inhomogeneous and random aesthetic allowing the realization of unique parts. Forged composite materials such as carbon, aramid (Kevlar®) or glass fibres, sometimes combined and structured with a polymer resin, do not have very good scratch resistance and low hardness (<100HV).

Ceramics, for example of the zirconia or alumina type, have a high resistance to abrasion and can be considered as scratchproof. Ceramics are materials with a homogeneous and identical visual appearance from one part to another, which has a negative impact on the diversity of the visual appearance of ceramic parts. Moreover, ceramics have the disadvantage of being fragile due to their structure.

The use of a FAST/SPS (Spark Plasma Sintering) process to increase the mechanical strength of ceramic material is known from the prior art.

As an example, U.S. Pat. No. 8,906,498 discloses a process for manufacturing a sandwich of shock resistant material. The process includes a SPS (Spark Plasma Sintering) of a ceramic powder to form a tile and coupling a ductile support layer to the tile. The ductile support layer may include a layer of polyethylene fibres.

Another example is disclosed in CN108299000A, which describes a method for preparing a SiC-type composite material at low temperature. The method includes in particular the cutting of carbon fibres into a length of 1 to 3 mm and various steps to obtain a uniformly mixed powder. An SPS sintering operation of the powder, placed in a graphite die, is then performed.

These processes have a negative impact on the diversity of the visual aspect of the ceramic parts obtained, which are essentially homogeneous.

An aim of the invention is therefore to propose a manufacturing process for a composite material with a ceramic matrix that allows the production of watch components with a unique and random visual appearance from one piece to another.

Another aim of the invention is to provide a manufacturing process for a composite material with a ceramic matrix that has the advantage of being lightweight and has high scratch resistance as well as high mechanical strength.

BRIEF SUMMARY OF THE INVENTION

According to the invention, these aims are achieved in particular by a process for manufacturing a watch component in a composite material with a ceramic matrix. The manufacturing process comprises the following steps:
  depositing in a mould a succession of layers each comprising a ceramic powder, at least one layer of the succession of layers further comprising fibres mixed with the ceramic powder, the fibres being arranged in a random manner;
  performing a FAST/SPS sintering operation;
  demoulding the sintered watch component comprising the succession of layers, and
  machining or finishing the sintered component to the final dimensions of the watch component;
  the fibres being partially visible on the surface of the watch component.

In an embodiment, at least two layers of the succession of layers comprise fibres.

In an embodiment, the at least two layers are separated by another layer of the succession of layers. The other layer does not contain any fibres.

In an embodiment, the at least two layers are adjacent. The composition of one of the two adjacent layers is different from the composition of the other of the two adjacent layers.

In an embodiment, all layers of the succession of layers have fibres. The composition of one of the layers is different from the composition of any of the other layers.

The sintering time is typically between 1 minute and 90 minutes.

The sintering temperatures are preferably between 800° C. and 2000° C.

In an embodiment, the ceramic powder is a composite selected from one of the following three composites: Zirconia with Alumina Matrix (ZTA), Alumina with Zirconia Matrix (ATZ) and Zirconia stabilized at least partially with Yttrium (Y-TZP)

In an embodiment, the ceramic powder is composed of a mixture of Zirconia with alumina matrix (ZTA), Alumina with Zirconia matrix (ATZ), and Zirconia stabilized, at least partially, with Yttrium (Y-TZP).

The fibres are preferably selected from carbon fibres, basalt fibres, glass fibres, aramid fibres and ceramic fibres.

The proportion by mass of fibres of said at least one layer comprising fibres is between 1.5% and 55%, preferably between 1.5% and 25%.

The fibres have a length between 2 mm and 70 mm, preferably between 3 mm and 50 mm.

In an embodiment, the watch component is a component of a watch case, in particular a case middle, a case back, a bezel or a crown.

In an embodiment, the watch component is a component of a watch movement, in particular a lock plate or a bridge.

A watch component manufactured by the process according to the invention has the advantage that it can be reliably identified or authenticated, for example, using a process comprising the following steps:
  capturing an image of the watch component of the timepiece having randomly distributed fibres on the surface;
  comparing this image to a database of images stored on a server, the database comprising a series of images of randomly distributed fibres, each image in said database being associated with another distinctive feature of the timepiece, and
  authenticating or identifying the timepiece by matching the captured image to one of the images in the database.

The image database is created from a multitude of images captured for each watch component manufactured by the process according to the invention.

In an embodiment, the distinctive element is selected among a serial number, the production date and the calibre of the timepiece.

BRIEF DESCRIPTION OF THE FIGURES

Examples of embodiments of the invention are disclosed in the description illustrated by the appended figures in which.

EXAMPLE(S) OF EMBODIMENTS OF THE INVENTION

The watch component in composite material, as described later, is obtained by a manufacturing process including notably a flash sintering operation, or "Field Assisted Sintering Technique/Spark Plasma Sintering (FAST/SPS)", which is a sintering process similar to hot isostatic pressing but using the Joule effect to heat a pre-compacted powder in a mould between two graphite electrodes in an inert atmosphere or under vacuum, the whole being subjected to a pressure of several megapascals under the action of a hydraulic press. A direct or alternating current of several kiloamperes, pulsed or not, is applied between the electrodes with a voltage of a few volts.

Figure 4:
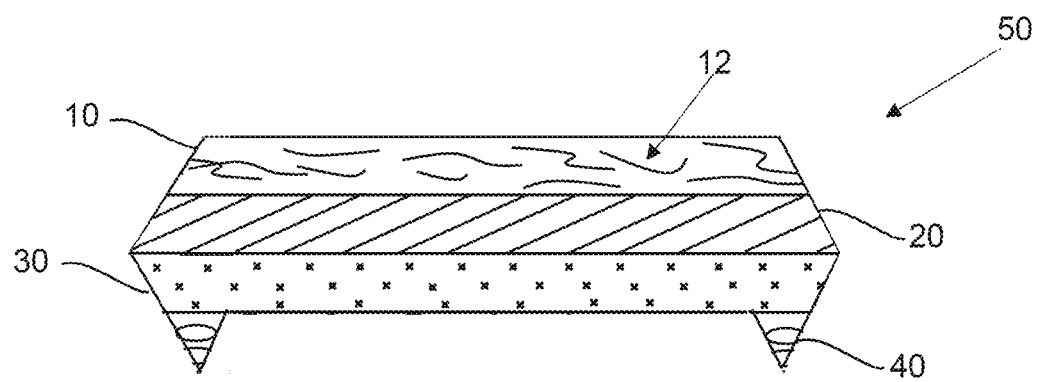
FIG. 4 is a schematic view of a section of a case middle of a watch, according to an embodiment of the invention, obtained by machining the composite material of FIG. 2 to the final dimensions of the case middle.

The manufacturing process for a watch component, for example a case middle 50 according to FIG. 4, from a composite material with a ceramic matrix consists in depositing several successive layers 10, 20, 30, 40 in a mould (not shown).

Figure 1:
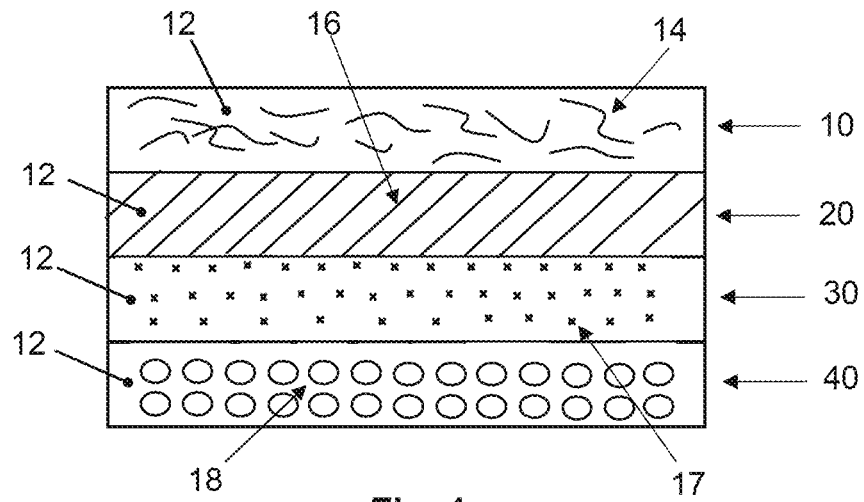
FIG. 1 is a schematic view of a section of a composite material composed of several layers of different kinds according to an embodiment of the invention before the sintering operation.

With reference to FIG. 1, each of the successive layers 10, 20, 30, 40 of the composite material includes a pre-compacted ceramic powder 12. The final layer 10 further includes fibres 14 mixed with the ceramic powder. The fibres are mixed with the ceramic powder 12 prior to the application of the last layer in the mould to provide a final layer 10 where the fibres are randomly arranged.

The pre-compacted ceramic powder 12 in each layer forms a ceramic matrix.

The powder 12 constituting the ceramic matrix may, for example, be a composite selected from one of the following three composites: Zirconia with Alumina Matrix (ZTA), Alumina with Zirconia Matrix (ATZ) and Zirconia stabilized at least partially with Yttrium (Y-TZP).

In another embodiment, the ceramic matrix 12 may comprise a mixture of the three composites mentioned above.

The fibres 14 randomly arranged in the ceramic matrix 12 of the layer 10 are, for example, fibres selected from carbon fibres, basalt fibres, glass fibres and aramid fibres.

The ceramic matrix may also incorporate a mixture of these different types of fibres. The proportion of fibres by mass in the layer 10 is generally between 1.5% and 55%, preferably between 1.5% and 25%, or even between 1.5% and 10%. Moreover, the length of these fibres is between 2 mm and 70 mm, preferably between 3 mm and 50 mm, or even between 3 mm and 6 mm.

The other layers 20, 30, 40 of the composite material of FIG. 1 are constituted by a ceramic matrix which may each include pigments 16, 17, 18 of different kinds in order to give to these layers different colours so that the watch component, obtained by a FAST/SPS sintering process and rectified by machining in order to obtain the final dimensions of the component, has a visual aspect where the demarcation between the different layers is visible on the surface of the watch component.

Figure 2:
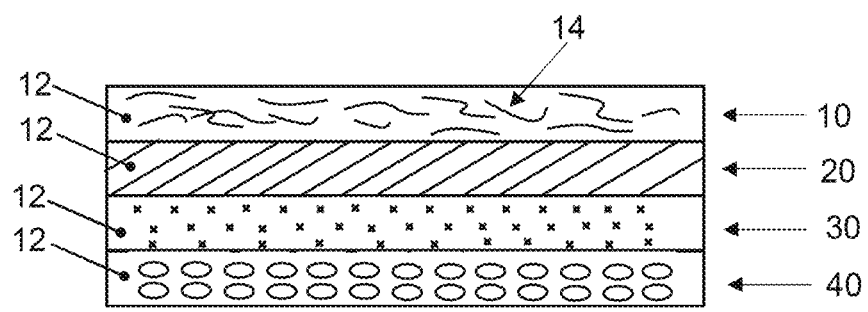
FIG. 2 is a schematic view of a section of the composite material according to FIG. 1 after the sintering operation.

The composite material according to FIG. 1 then undergoes a FAST/SPS sintering operation. After the compression and sintering operation, the dimensions of the composite material are significantly reduced in size as can be seen in FIG. 2.

The sintering time and temperature depend on the composition of the different layers 10, 20, 30, 40, but also on the size and shape of the part to be sintered. The temperature range is between 800 and 2000° C., preferably between 900 and 1500° C., while the sintering time (plateau time) is between 1 and 90 minutes, preferably between 2 and minutes when each of the layers comprises a ceramic matrix. For example, for a case middle made of a first layer of Zirconia stabilized with Yttrium having a thickness of 1 mm, of green colour and comprising 5% in mass of carbon fibres, of a second layer of Zirconia stabilized with Yttrium having a thickness of 2 mm and of blue colour, of a third layer of Zirconia stabilized with Yttrium having a thickness of 2 mm and of green colour, and of a fourth layer of Zirconia stabilized with Yttrium having a thickness of 1 mm, of brown colour and comprising 10% by mass of carbon fibres, the sintering temperature is approximately 1050° C. and the sintering time is approximately 12 minutes.

Upon completion of the FAST/SPS sintering operation, the composite material is cooled down and demoulded. The sintered composite material is then machined to the final dimensions of the watch component to obtain, for example, a case middle shown in FIG. 4. Alternatively, the part is not machined but finished, for example polished or decorated.

Figure 3:
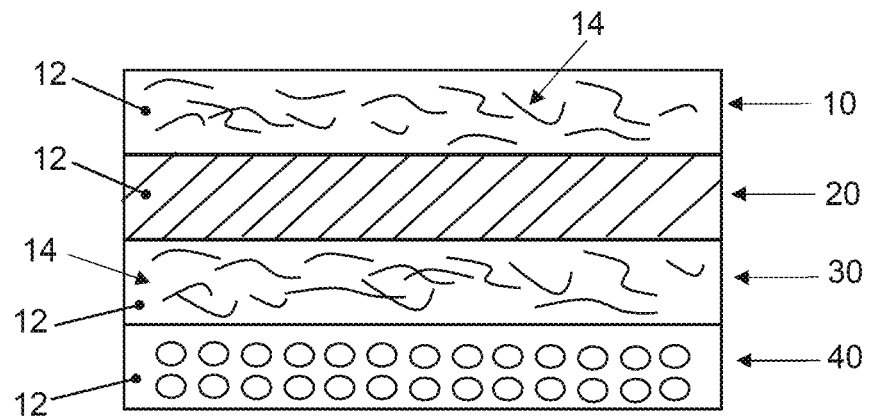
FIG. 3 is a schematic view of a section of a composite material composed of several layers of different kinds according to another embodiment of the invention.

In an embodiment illustrated in FIG. 3, successive layers 10, 20, 30, 40 of the composite material with a ceramic matrix comprise a first and second layer 10, 30 each having randomly arranged fibres 14. The arrangement of the fibres 14 in the first layer 10 is different from the arrangement of the fibres in the second layer 30. The first and second layers 10, 30 are separated by a third layer 20 which may include some type of pigment 16 in order to give to this layer a particular visual appearance, notably in terms of its colour, which is different from the visual appearance of the first and second layers 10, 30.

In another non-illustrated embodiment, at least two adjacent layers of the succession of layers forming the composite material include fibres. The composition of one of the two adjacent layers is different from the composition of the other of the two layers.

In an additional non-illustrated embodiment, all the layers of the succession of layers forming the composite material include fibres. The composition of one of the layers is different from the composition of any of the other layers.

The watch component obtained by the FAST/SPS sintering manufacturing process according to the invention, for example the case middle 50 illustrated in FIG. 4, has the advantage of being light, having a high resistance to scratches as well as a unique and random visual appearance, i.e., the visual appearance of the watch components obtained by this manufacturing process differs from one component to another.

Thanks to the unique visual aspect of the fibres, a watch component with a unique visual aspect, such as a case middle is obtained. This makes it possible to authenticate or identify a timepiece comprising, for example, the case middle of a watch manufactured according to the previously described method. Authentication or identification of the timepiece may be performed by comparing the visual appearance of the photographed timepiece, or features of that appearance, with reference photographs or databases of reference timepiece features.

For example, the method initially involves capturing an image of the watch component of the timepiece having randomly distributed fibres on the surface, such as a portion of the case middle. The captured image is then compared to a database of images stored on a server. The database includes a series of images of randomly distributed fibres created from a multitude of images captured for each watch component manufactured by the process according to the invention.

Authentication or identification of the timepiece is then performed by matching the captured image to one of the images in the database.

The invention claimed is:

1. Manufacturing process for a watch component in a composite material with a ceramic matrix, comprising the following steps:
    depositing in a mould a succession of layers, each comprising a ceramic powder, at least one layer of said succession of layers further comprising fibres mixed with the ceramic powder, the fibres being arranged randomly;
    performing a FAST/SPS sintering operation;
    demoulding the sintered watch component comprising the succession of layers, and
    machining or finishing the sintered component to the final dimensions of the watch component;
    said fibres being visible on the surface of the watch component.

2. The process of claim 1, wherein at least two layers of said succession of layers comprise fibers.

3. The process of claim 2, wherein said at least two layers are separated by another layer of said succession of layers, said other layer does not comprise fibers.

4. The process of claim 2, wherein said at least two layers are adjacent, the composition of one of the two layers being different from the composition of the other of the two layers.

5. The process of claim 1, wherein all layers of said succession of layers comprise fibres, the composition of one of the layers being different from the composition of any of the other layers.

6. The process of claim 1, wherein the sintering time is between 1 and 90 minutes, preferably between 2 and 45 minutes.

7. The process of claim 1, wherein the sintering temperatures are between 800° C. and 2000° C., preferably between 900 and 1500° C.

8. The process of claim 1, wherein said ceramic powder is a composite selected from one of the following three composites: Zirconia with Alumina Matrix (ZTA), Alumina with Zirconia Matrix (ATZ) and Zirconia stabilized at least partially with Yttrium (Y-TZP).

9. The process of claim 1, wherein said ceramic powder is composed of a mixture of Zirconia with Alumina Matrix (ZTA), Alumina with Zirconia Matrix (ATZ), and Zirconia stabilized at least partially with Yttrium (Y-TZP).

10. The process of claim 1, wherein the fibres are selected from carbon fibres, basalt fibres, glass fibres and aramid fibres.

11. The process of claim 1, wherein the proportion by mass of the fibres in said at least one layer comprising fibres is between 1.5% and 55%, preferably between 1.5% and 25%.

12. The process of claim 1, wherein the fibres have a length between 2 mm and 70 mm, preferably between 3 mm and 50 mm.

13. The process of claim 1, wherein the watch component is a component of a watch case, in particular a case middle, a case back, a bezel or a crown.

14. The process of claim 1, wherein the watch component is a component of a watch movement, in particular a lock plate or a bridge.

* * * * *